(12) United States Patent
Fukushima

(10) Patent No.: US 8,548,357 B2
(45) Date of Patent: Oct. 1, 2013

(54) DRIVE TRANSMISSION SYSTEM, DRIVING DEVICE, AND IMAGE FORMING APPARATUS INCORPORATING DRIVE TRANSMISSION SYSTEM

(75) Inventor: Tatsuo Fukushima, Ohsaka-fu (JP)

(73) Assignee: Ricoh Company, Ltd., Tokyo (JP)

( * ) Notice: Subject to any disclaimer, the term of this patent is extended or adjusted under 35 U.S.C. 154(b) by 246 days.

(21) Appl. No.: 12/926,974

(22) Filed: Dec. 21, 2010

(65) Prior Publication Data

US 2011/0158711 A1  Jun. 30, 2011

(30) Foreign Application Priority Data

Dec. 25, 2009 (JP) ................................. 2009-295908

(51) Int. Cl.
- *G03G 15/00* (2006.01)
- *F16H 1/06* (2006.01)
- *F16C 33/24* (2006.01)

(52) U.S. Cl.
USPC .............................. 399/167; 74/414; 384/287

(58) Field of Classification Search
USPC ........... 399/167; 74/412 R, 413, 414, 421 R, 74/421 A; 384/286, 287, 289, 291
See application file for complete search history.

(56) References Cited

U.S. PATENT DOCUMENTS

| | | | | |
|---|---|---|---|---|
| 5,631,726 A | * | 5/1997 | Sawada | 399/111 |
| 5,905,927 A | * | 5/1999 | Inoue et al. | 399/167 |
| 6,980,753 B2 | * | 12/2005 | Yoshiki | 399/103 |
| 2008/0226352 A1 | | 9/2008 | Tanaka et al. | |
| 2008/0226358 A1 | | 9/2008 | Hanashima et al. | |
| 2010/0192710 A9 | | 8/2010 | Hanashima et al. | |

FOREIGN PATENT DOCUMENTS

| | | |
|---|---|---|
| JP | 58-150663 | 10/1983 |
| JP | 1-126499 | 8/1989 |
| JP | 04-351365 | 8/1989 |
| JP | 08-093770 A | 4/1996 |
| JP | 08-268235 A | 10/1996 |
| JP | 2001-082474 A | 3/2001 |
| JP | 2004-226695 A | 8/2004 |
| JP | 2006-141830 A | 6/2006 |
| JP | 2007-009977 A | 1/2007 |

OTHER PUBLICATIONS

Japanese Office Action for corresponding Japanese Application No. 2009-295908 dated May 24, 2013.

* cited by examiner

*Primary Examiner* — David Gray
*Assistant Examiner* — Gregory H Curran
(74) *Attorney, Agent, or Firm* — Harness, Dickey & Pierce P.L.C.

(57) ABSTRACT

A drive transmission system includes a shaft member storing grease in a shaft outer circumferential small diameter section. A drive transmission gear is provided including a gear inner circumferential sliding section and a gear inner circumferential large diameter section. A gear moving device is provided to move the drive transmission gear reciprocally along the shaft member in a shaft direction. A restriction device is provided to restrict a movement range of the drive transmission gear along the shaft member in the shaft direction to enable the gear inner circumferential large diameter section to face the shaft outer circumferential small diameter section substantially continuously.

20 Claims, 12 Drawing Sheets

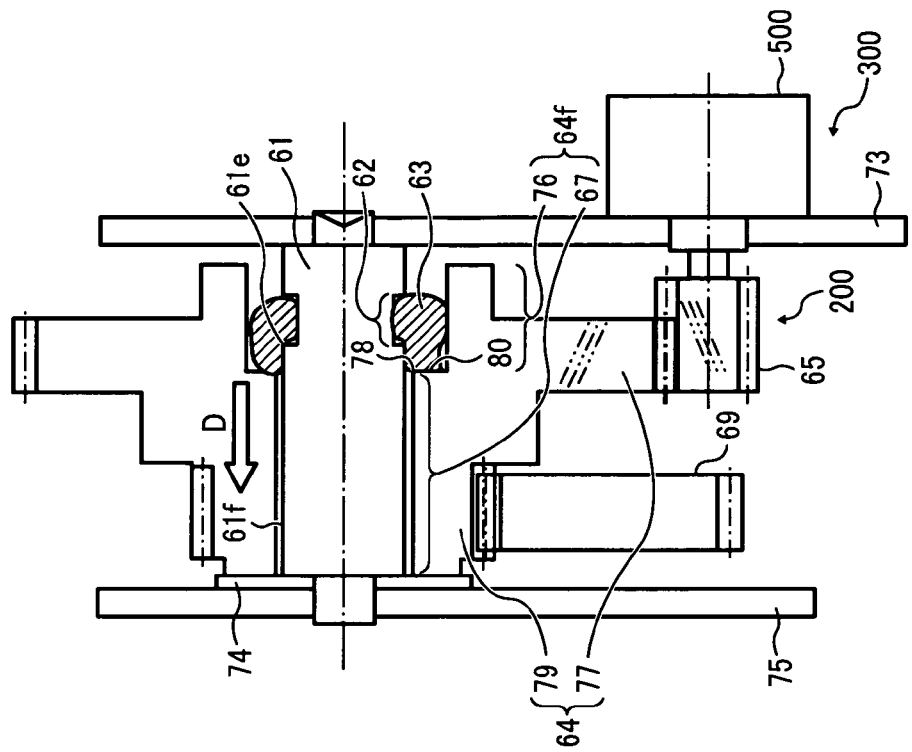
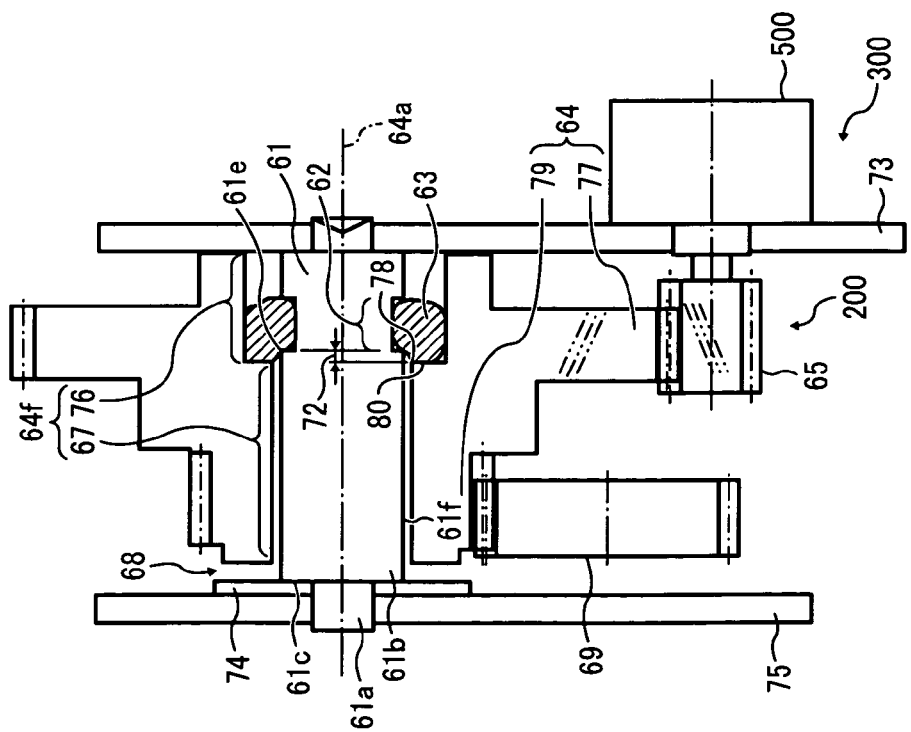

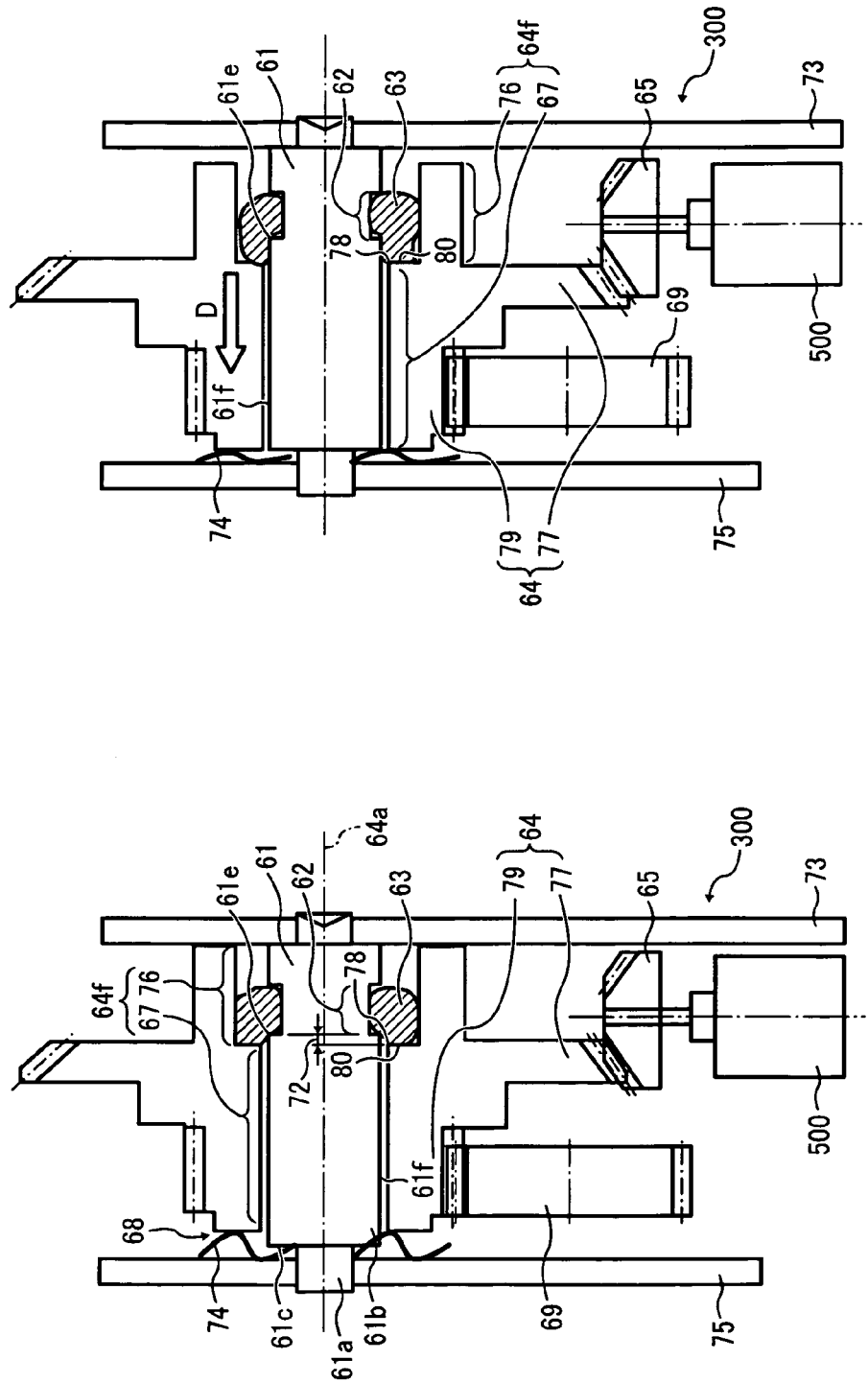

US 8,548,357 B2

DRIVE TRANSMISSION SYSTEM, DRIVING DEVICE, AND IMAGE FORMING APPARATUS INCORPORATING DRIVE TRANSMISSION SYSTEM

CROSS-REFERENCE TO RELATED APPLICATIONS

This application claims priority pursuant to 35 USC §119 to Japanese Patent Application No. 2009-295908, filed on Dec. 25, 2009, the entire contents of which are hereby incorporated by reference herein.

BACKGROUND OF THE INVENTION

1. Field of the Invention

The present invention relates to a drive transmission system equipped with a stationary shaft member secured to an apparatus body and a drive transmission gear rotatable around the stationary shaft member, and in particular to a driving system and an image forming apparatus each equipped with the drive transmission system.

2. Description of the Background Art

In accordance with a demand for a longer-lasting, more durable image forming apparatus that employs an electrophotographic system, a drive transmission system that transmits a rotation driving force from a driving source to a rotation member such as a photo-conductive member is also required to be long-lasting and durable. In one such known exemplary drive transmission system, a stationary shaft member is secured to a casing of an apparatus body while a drive transmission gear rotates around the stationary shaft member to transmit a rotation driving force from a driving source to a rotation member via a drive transmission gear. In such a drive transmission system, in order for the drive transmission system can enjoy a longer life, durability of in order for the drive transmission system can enjoy a longer life, durability of a rotational sliding section existing between the drive transmission gear and the stationary shaft member must be improved.

As a system that improves such durability of the rotational sliding section, a coupling drive mechanism serving as a drive transmission system is employed as described in Japanese Patent Application Laid Open No. 2001-82474 (JP-2001-82474-A). Specifically, a bearing member is provided in a rotational sliding section between a drive transmission gear and a stationary shaft member. However, the bearing member is rarely employed in the rotational sliding section in compact, inexpensive image forming apparatuses.

Further, in a drive transmission system excluding such a bearing member in the rotational sliding section, an inner circumferential surface of the drive transmission gear generally slides while in frictional contact with an outer circumferential surface of the stationary shaft member when the drive transmission gear is rotated. Accordingly, the sliding section of the inner circumferential surface of the drive transmission gear (hereinafter referred to as a gear inner circumference sliding section) and that of the outer circumferential surface of the sliding section of the stationary shaft member (hereinafter referred to as a shaft outer circumferential sliding section) need improved durability.

Further, it is known that one image forming apparatus in actual use employs a drive transmission system in which a grease groove filled with grease is provided on an outer circumferential surface of the stationary shaft member.

For example, some conventional drive transmission systems include grease grooves on outer circumferential surfaces of stationary shaft members as shown in FIGS. 11 and 12, respectively, wherein FIG. 11A illustrates a section when viewed along a line B-B of FIG. 11B, through which a rotation central line of a drive transmission system passes, and FIG. 11B illustrates a front view of the drive transmission system in a direction shown by an arrow A of FIG. 11A, respectively. In a first conventional drive transmission system 200, there are provided a stationary shaft member 61 secured to a frame 75 serving as a casing of an apparatus body and a drive transmission gear 64 rotating around the stationary shaft member 61. As shown, an input gear for inputting a driving force to the drive transmission gear 64 and an output gear for outputting a driving force from the drive transmission gear 64 are also provided but omitted from FIGS. 11A and 11B.

In such a first conventional drive transmission system 200, when a driving force is transmitted from an input gear, not shown, to the drive transmission gear 64, the drive transmission gear 64 rotates in a direction shown by an arrow C. At that moment, a gear inner circumferential surface 64$f$ of the drive transmission gear 64 slides on a shaft outer circumferential surface 61$f$ of the stationary shaft member 61. Further, a grease groove 62 filled with the grease 63 is provided on the shaft outer circumferential surface 61$f$ in a shaft direction of the stationary shaft member 61. When the drive transmission gear 64 rotates in a direction shown by an arrow C, a portion of the gear inner circumferential surface 64$f$ to which the grease is attracted moves to a position facing the shaft outer circumferential surface 61$f$. As a result, the grease 63 can enter a section between the gear inner circumference sliding section of the gear inner circumferential surface 64$f$ and the shaft outer circumference of the shaft outer circumferential surface 61$f$, thereby suppressing wear and improving durability of the gear inner circumference sliding section and the shaft outer circumferential surface sliding section.

However, in such a first conventional drive transmission system 200, the shaft direction in which the groove edge section 61$e$ extends as a boundary between the shaft outer circumferential surface 61$f$ and the grease groove 62, and the direction in which the gear inner circumferential surface 64$f$ moves in relation to the stationary shaft member 61 are orthogonal to each other. In such a situation, when the drive transmission gear 64 rotates, the groove edge section 61$e$ contacts the gear inner circumferential surface 64$f$ sliding around the stationary shaft member 61 in a counter direction, so that the gear inner circumferential surface 64$f$ slides in friction with the groove edge section 61$e$, and is susceptible to burn-out.

A second conventional drive transmission system is then utilized to resolve such a problem, as described with reference to FIG. 12, which illustrates a cross section of a drive transmission gear 64 along its rotation central line 64$a$.

Specifically, in the second conventional drive transmission system 200, there are provided a stationary shaft member 61 secured to a frame 75 serving as a casing of an apparatus body and a drive transmission gear 64 rotating around the stationary shaft member 61. Further provided are an input gear 65 for inputting a driving force from a drive motor 500 to a drive transmission gear 64 and an output gear 69 for outputting a driving force from the drive transmission gear 64 to a driven section, not shown. The drive transmission gear 64 is a two-step gear having large- and small-diameter sections 77 and 79, respectively. When the drive motor 500 operates and accordingly the input gear 65 rotates, a rotational driving force caused in this way is inputted to the large diameter section 77, thereby rotating the drive transmission gear 64. Owing to the rotation of the drive transmission gear 64, the small diameter section 79 of the drive transmission gear 64 and the output gear 69 linked therewith rotate, so that a rotation driving force of the drive motor 500 is transmitted to the driven section.

The large diameter section 77 of the drive transmission gear 64 and the input gear 65 employ helical gears, respectively. Thus, a thrusting force acts on the drive transmission gear 64 in a direction shown by arrow D in parallel to a rotation central line 64a when the input gear 65 and the drive transmission gear 64 rotate. Consequently, when the drive motor 500 operates and a rotation driving force caused in this way is inputted to the drive transmission gear 64, the drive transmission gear 64 moves in a direction in which a thrusting force acts by an amount of thrusting allowance 68 and rotates there colliding with a washer 74.

When the drive motor 500 stops, the drive transmission gear 64 is biased by a biasing member in a direction opposite to the thrusting force acting direction, and separates from the washer by the amount of thrusting allowance 68. By repeating such controlling of the drive motor 500, the drive transmission gear 64 moves reciprocally in the thrusting direction of the shaft line direction. Further, a grease groove 62 filled with grease 63 is provided entirely around a shaft outer circumferential surface 61f of a cylindrical stationary shaft member 61. When the driving motor 500 operates thereby moving the drive transmission gear 64 in the thrusting direction, a portion of the gear inner circumferential surface 64f facing the grease groove 62 while receiving the grease 63 therefrom while the motor is stopped is shifted to a different position facing the shaft outer circumferential surface 61f on a thrusting direction side of the grease groove 621. Thus, the grease 63 is attracted to the different position on the shaft outer circumferential surface 61f. Subsequently, when the driving motor 500 stops and the drive transmission gear 64 moves in the opposite direction to the thrusting direction, the grease attraction portion on the shaft outer circumferential surface 61f faces the shaft outer circumferential surface 61f on a thrusting direction side than that facing the grease groove 62 during the stop condition. Thus, the grease 63 can be attracted to the portion on the gear inner circumferential surface 64f. By repeating such controlling of the drive motor 500 and reciprocating the drive transmission gear 64 along the shaft line direction in this way, the grease in the grease groove 62 can be supplied in the thrusting direction. Thus, the grease 63 can enter between the gear inner circumferential surface 64f and the shaft outer circumferential surface 61f. As a result, wear is suppressed in the gear inner circumference sliding section and the shaft outer circumference sliding section, so that durability can be improved.

Further, since the groove edge section 61e serving as a boundary between the grease groove 62 and the shaft outer circumferential surface 61f is arranged in a sliding direction, the grease groove 62 and the shaft outer circumferential surface 61f do not slide in friction with each other, and burning does not occur therebetween when the drive transmission gear 64 rotates.

However, since an inner diameter of a portion of a gear inner circumferential surface 64f facing a shaft outer circumferential surface 61f and that of a portion of a gear inner circumferential surface 64f facing a grease groove 62 are substantially the same, only an amount of grease equivalent to a capacity of the grease groove 62 can be filled in the grease groove 62 and cannot be continuously supplied for a long time period between the gear inner circumferential surface 64f and the shaft outer circumferential surface Elf.

Further, when the grease is insufficiently supplied between the gear inner circumferential surface 64f and the shaft outer circumferential surface 61f, sliding load increases therebetween, and accordingly a life of the drive transmission system becomes short.

SUMMARY OF THE INVENTION

Accordingly, an object of the present invention is to provide a new and novel drive transmission system comprising a shaft member including an shaft outer circumferential sliding section on its outer circumferential surface, and a shaft outer circumferential small diameter section having a smaller diameter than that of the shaft outer circumferential sliding section as a groove circulating around its outer circumferential surface storing grease, and a drive transmission gear freely rotatably supported by the shaft member therearound. The drive transmission gear is rotated when a rotation driving force is input thereto. The drive transmission gear includes a gear inner circumferential sliding section on its inner circumferential surface. The gear inner circumferential sliding section contacts and slides on the shaft outer circumferential sliding section of the shaft member when the drive transmission gear rotates. A gear inner circumferential large diameter section having a large diameter than that of the gear inner circumferential sliding section on its inner circumferential surface is provided. A gear moving device is provided to move the drive transmission gear reciprocally along the shaft member in a shaft direction. A restriction device is provided to restrict a movement range of the drive transmission gear along the shaft member in the shaft direction to enable the gear inner circumferential large diameter section to face the shaft outer circumferential small diameter section substantially continuously.

In another aspect, the gear moving device is a gear mechanism to provide a thrusting force to the drive transmission gear when rotating the drive transmission gear.

In yet another aspect, the gear mechanism includes one of a helical gear, a wheel gear, a bevel gear, and a worm wheel.

In yet another aspect, the drive transmission gear is a two-step gear having two gears, one of which is the gear mechanism.

In yet another aspect, a diameter of an inner circumference surface of the drive transmission gear increases from the gear inner circumferential sliding section to the gear inner circumferential large diameter section forming a chamfered cross section therebetween.

In yet another aspect, a diameter of an inner circumference surface of the drive transmission gear gradually increases from the gear inner circumferential sliding section to the gear inner circumferential large diameter section forming a cut-away cross section therebetween.

In yet another aspect, a diameter of an inner circumference surface of the drive transmission gear gradually increases from the gear inner circumferential sliding section to the gear inner circumferential large diameter section forming a round shaped cross section therebetween.

In yet another aspect, a drive source is provided to drive and rotate an objective, and a drive transmission device is provided to transmit a rotation driving force from the drive source to a rotation member. The drive transmission device includes the drive transmission system.

In yet another aspect, an image forming apparatus includes an image formation section that forms an image on a recording medium by initially forming an image on an image bearer and finally transferring the image onto the recording medium, and the driving device that drives a driving objective arranged in an apparatus body.

BRIEF DESCRIPTION OF DRAWINGS

A more complete appreciation of the present invention and many of the attendant advantages thereof will be readily obtained as the same becomes better understood by reference to the following detailed description when considered in connection with the accompanying drawings, wherein:

FIGS. 1A and 1B collectively illustrate an exemplary drive transmission system according to a first embodiment of the present invention;

FIGS. 6A and 6B collectively illustrate an exemplary drive transmission system according to a third embodiment of the present invention;

DESCRIPTION OF PREFERRED EMBODIMENTS

Figure 2:
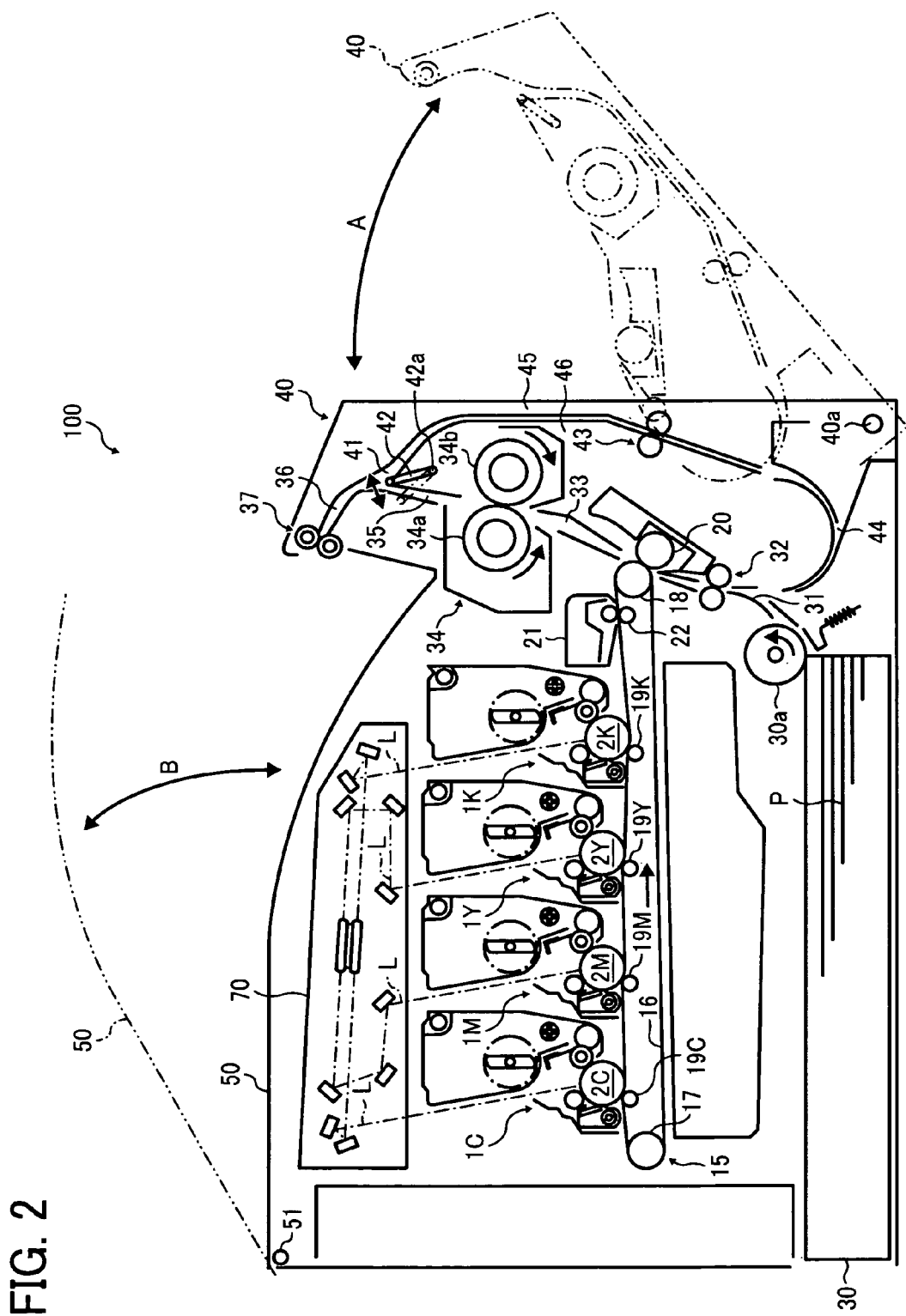
FIG. 2 schematically illustrates an exemplary printer according to one embodiment of the present invention.
Figure 3:
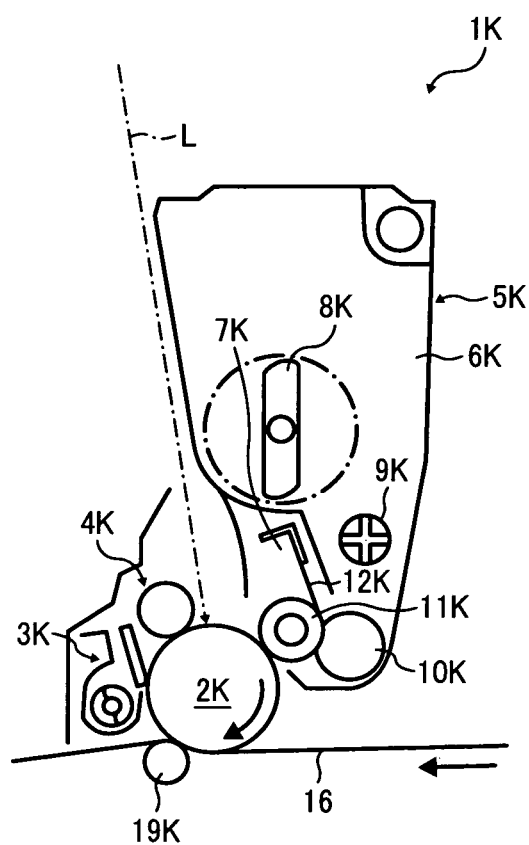
FIG. 3 illustrates an exemplary K-process unit included in the printer of FIG. 2.

Referring now to the drawings, wherein like reference numerals designate identical or corresponding parts throughout the several views, in particular in FIGS. 1 to 3, an exemplary printer as an image forming apparatus that employs an electrophotograph system is described.

The fundamental configuration and operation of the printer without an inversion unit are described in detail in US2008/0226352-A1 in columns 0020 and 0021, and US2010/0192710-A9 in columns 0026 to 0038 filed by the applicant, and such description is incorporated therein.

Specifically, the inversion unit 40 includes an external cover 45 and a swinging member 46. The external cover 45 is swingably supported around a unit swing shaft 40a provided in the casing of the printer body 100 as shown by an arrow A in FIG. 2. With such swinging, the external cover 45 is open and closes together with a swinging member 46 installed therein. When the external cover 45 is open together with the swinging member 46, a sheet feeding path 31, a secondary transfer nip, a post transfer conveyance path 33, a fixing nip, a post fixing conveyance path 35, and a sheet ejection path 36 each formed between the inversion unit 40 and the printer body 100 are separated into two and exposed outside. Consequently, a sheet jamming on the sheet feeding path 31, that in the secondary transfer nip, that on the post transfer conveyance path 33, that in the fixing nip, that on the post fixing conveyance path 35, and that on the sheet ejection path 36 can be readily removed. Further, the swing member 46 is supported by the external cover 45 to swing around a swing shaft, not shown, provided in the external cover 45 when the external cover 45 is open. Due to the swinging, a pre-inversion conveyance path 41 and the inversion conveyance path 44 are vertically separated into two and are exposed outside when the swinging member 46 is open with regard to the external cover 45. Consequently, a sheet jamming on the pre-inversion conveyance path 41 and the inversion conveyance path 44 can be readily removed.

An upper cover 50 arranged on the casing of the printer 100 is freely swingably supported around an upper cover swing shaft 51 as shown by an arrow B in FIG. 2. Thus, when the upper cover 50 swings counter clockwise in the drawing, the upper cover 50 becomes open with regard to the casing. Then, an upper opening appearing on the casing is largely exposed outside, so that the optical writing unit 70 is exposed.

In the printer 100, since the optical writing unit 70 is arranged above the four process units 1K to 1C as mentioned above, the four process units 1K to 1C cannot be recognized from above only by opening the upper cover 50. Further, since the optical writing unit 70 is visually obstacle, maintenance for the process units is impossible thru the upper opening appearing as the upper cover 50 is open if no countermeasure is taken. Thus, the optical writing unit 70 is detachable to the casing of the printer 100. When, any one of the four process units 1K to 1C is to be replaced, the upper cover 50 is open and the optical writing unit 70 is detached to expose the process units 1K to 1C, so that an intended process unit 1 can be detached and is replaced. To open the upper cover 50 and detach the process unit 1 from the apparatus body, an optical writing unit 70 can be secured to the upper cover 50 so that the optical writing unit 70 separates from above the process units 1K to 1C together with the upper cover 50 when the upper cover 50 is open.

Figure 4:
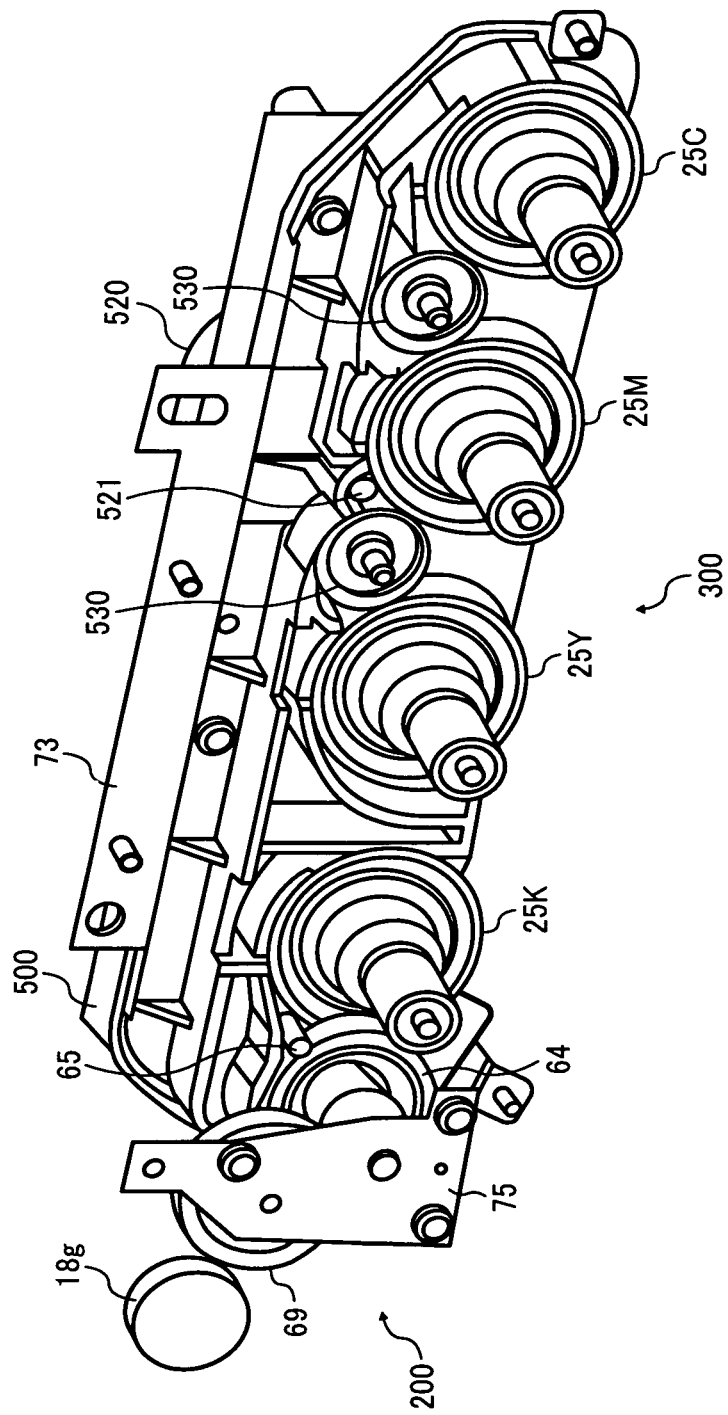
FIG. 4 illustrates an exemplary drive transmission system for transmitting a driving force to a drive roller included in the printer of FIG. 2.

Now, a driving device 300 that drives a belt driving roller 18 for rotating an intermediate transfer belt is described with reference to FIG. 4. When the driving motor 500 of the driving system 300 operates, an input gear 65 secured to a rotational shaft of the driving motor 500 rotates and transmits a rotation driving force to the driving roller gear 18g via a drive transmission gear 64 and an output gear 69.

The driving system 300 includes plural image formation section drive transmission gears 25K to 25C which transmit driving forces to respective four process units 1K to 1C. The K-use image formation section drive transmission gear 25K that transmits the driving force to the K-use process unit 1K meshes with the input gear 65 via its large diameter gear section. When the driving motor 500 operates and the input gear 65 rotates, the rotation driving force is inputted to the K-use image formation section drive transmission gear 25K. The rotation driving force is then transmitted to respective rotation driving members of a photoconductive member 2K, a charge roller, an agitator 8K, a stirring paddle 9K, a toner supply roller 10K, and a developing roller 11K or the like arranged in the K-use process unit 1K.

Further, the Y to C-use image formation section drive transmission gears 25Y to 25C, which transmission driving forces to the Y to C-use process units 1Y to 1C, rotate as a second driving motor 520 operates, respectively. Specifically, when the second driving motor 520 operates, a second input gear 521 secured to a rotational shaft of the second driving motor 520, and accordingly the M use image formation section drive transmission gear 25M that meshes with the second input gear 521 rotate. Further, the image formation section drive transmission gear 25M transmits and rotates the C and Y use image formation section drive transmission gears 25C and 25Y via two idler gears 530. As a result, the respective rotation driving members constituting the Y to C use process units 1Y to 1C receive the rotation driving force. When image formation is executed in a monochrome mode only using black toner, the photo-conductive members 2Y to 2C separate from the intermediate transfer belt 16 while the second driving motor 520 enters a halt condition.

Now, a first embodiment of a drive transmission system 200 that transmits a rotation driving force from a driving motor 500 provided in a driving device 300 to the drive roller gear 18g is described with reference to FIGS. 1A and 1B, which illustrate stopping and operating conditions of the driving motor 500, respectively.

As shown, the drive transmission system 200 includes a stationary shaft member 61 that is arranged horizontally. One end of the stationary shaft member 61 is screwed into a bracket 73, while the other end having a smaller diameter being inserted and held by a holder opening formed on a frame 75. A washer fits to the shaft small diameter section 61a, and is sandwiched by a thrusting surface 61c formed on the side of a shaft large diameter section 61b to serve as a boundary between the small and large diameter sections 61a and 61b of the stationary shaft member 61, and an end face of the frame 75. A drive transmission gear 64 is attached to the shaft large diameter section so that a gear inner circumferential surface 64f thereof faces a shaft outer circumferential surface 61f of the stationary shaft member 61. The drive transmission gear 64 of the drive transmission system 200 includes two steps of smaller and larger diameter gear sections 79 and 77. The large gear section 77 is a helical type and is linked with an input gear 65 of a helical gear. Whereas the small gear section 79 is a flat type and is linked with an output gear 69. When the input gear 65 and the drive transmission gear 64 rotate as a result of the linkage between the helical gears of the input gear and 65 and the larger diameter gear section 77, a thrusting force acts in a direction in parallel to a rotational center line 64a of the drive transmission gear 64 as shown by an arrow D in FIG. 1B.

A gear inner circumference sliding section 67 is formed on the gear inner circumferential surface 64f of the drive transmission gear 64 to contact and slide on the shaft outer circumferential surface 61f when the drive transmission gear 64 rotates. Further, a gear inner circumference large diameter section 76 having a larger diameter than that of the gear inner circumference sliding section 67 is formed on the gear inner circumferential surface 64f in the opposite direction to that of the arrow D regarding the gear inner circumference sliding section 67. A grease transfer surface 80 is formed perpendicular to the rotation central line 64a between a sliding section large diameter side edge 78 of the gear inner circumference sliding section 67 and the gear inner circumference large diameter section 76.

In such a situation, when the printer is expected to be compact and low cost, a private use-bearing member is hardly provided in the sliding section between the drive transmission gear 64 and the stationary shaft member 61. Then, a grease groove 62 having a smaller outer diameter than that of the shaft outer circumferential surface 61f is provided on the stationary shaft member 61. During a stop condition as shown in FIG. 1A, the grease groove 62 is located on the side of the bracket 73 of the sliding section large diameter side edge 78 being distanced therefrom by a grease groove distance 72. The grease groove distance 72 is greater than a width of a thrusting allowance 68. With such a configuration, even when the drive transmission gear 64 starts rotation as shown in FIG. 1B and moves in the direction shown by the arrow D thereby causing the thrusting force to work on after the stopping condition as shown in FIG. 1A, the grease groove 62 does not (closely) face the gear inner circumference sliding section 67. Thus, an excessive amount of grease 63 than a capacity of the grease groove 62 is prevented from being abraded by a section of the gear inner circumference sliding section 67. As a result, the grease 63 can be continuously supplied between the gear inner circumference sliding section 67 and the shaft outer circumferential surface 61f for a longer time period than before.

Further, burning can be avoided or suppressed even when the drive transmission gear 64 rotates and the gear inner circumferential surface 64f slides in friction with the groove edge section 61e. Because, the groove edge section 61e serving as a boundary between the grease groove 62 and the shaft outer circumferential surface 61f is formed in a sliding direction. It is also true in the second conventional example of FIG. 12. However, even if the groove edge section 61e is formed in the sliding direction, stress more highly likely occurs at the sliding section between the gear inner circumferential surface 64f and the groove edge section 61e in comparison with a configuration where only the shaft outer circumferential surface 61f slides on the gear inner circumferential surface 64f as in the first embodiment. As a result, burning readily occurs when the stress concentrates on the sliding section.

By contrast, in the drive transmission system 200 of the first embodiment of FIG. 1, the grease groove 62 does not (closely) face the gear inner circumference sliding section 67. Thus, since the groove edge section 61e serving as a boundary between the grease groove 62 and the shaft outer circumferential surface 61f does not either (closely) face or slide in friction with the gear inner circumferential surface 64f, the stress does not concentrate, so that the burning can be avoided or suppressed.

Further, the grease 63 filled in a space formed between the gear inner circumference large diameter section 76 and the grease groove 62 is transferred onto the grease transfer surface 80 while the motor is stopped. Thus, when both the input gear 65 and the drive transmission gear 64 rotate, and the thrusting force acts in the direction of the arrow D of FIG. 1B, the grease transfer surface 80 moves toward the washer 74. Specifically, the grease 63 transferred onto the grease transfer surface 80 moves to the shaft outer circumferential surface 61f and is supplied all around the shaft outer circumferential surface 61f as the drive transmission gear 64 rotates. As a result, wearing of both the shaft outer circumferential surface 61f and the gear inner circumference sliding section 67 can be avoided or suppressed.

Figure 12:
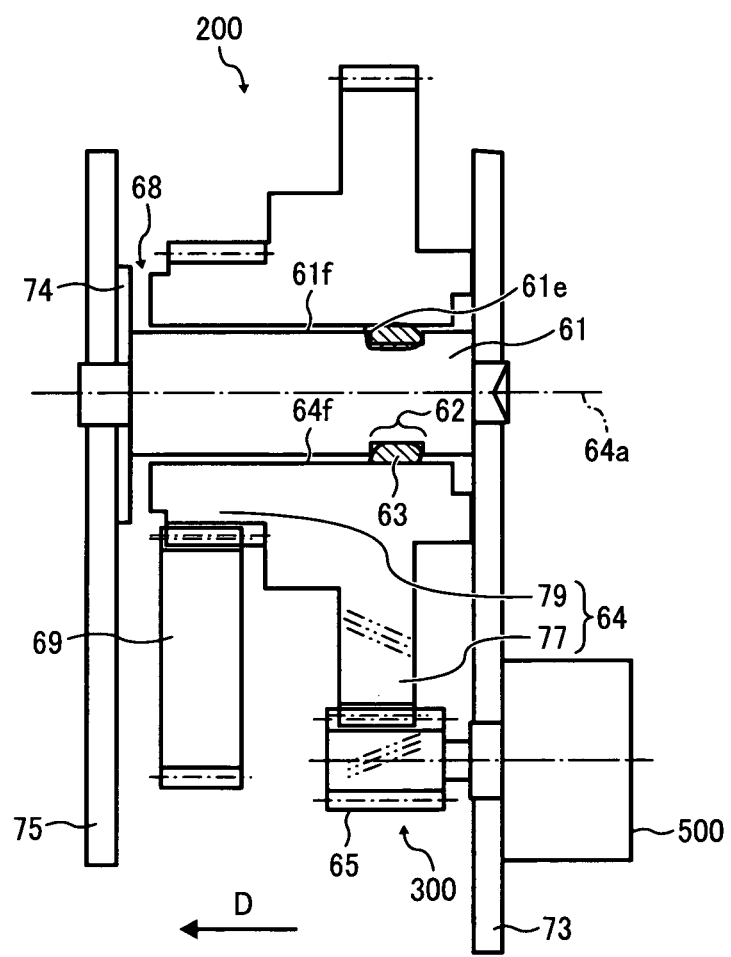
FIG. 12 illustrates a second conventional drive transmission system.

Whereas in a case where a gear inner circumferential surface 64 having the same inner diameter faces the grease groove 62 as in the second conventional drive transmission system 200 of FIG. 12, only a limited amount of the grease 63 can be filled therein. Because, a gap is narrow at a section facing the grease groove 62. Further, almost all of the grease 63 is extracted from the grease groove 62 by the gear inner circumferential surface 64f facing the grease groove 62.

Thus, the grease 63 cannot continuously be supplied between the gear inner circumferential surface 64f and the shaft outer circumferential surface 61f for a long time period.

By contrast, in the first embodiment of the drive transmission system 200 of FIG. 1, by arranging the gear inner circumference large diameter section 76 to face the grease groove 62, an amount of the grease 63 exceeding the capacity of the grease groove 62 can be filled into a space formed by the gear inner circumference large diameter section 76.

Further, the bracket 73, the frame 75, and the washer 74 collectively serving as a restriction device restricts movement of the drive transmission gear 64 in the shaft direction of the stationary shaft member 61 so that the gear inner circumferential large diameter section 76 can face the grease groove 62 continuously. Thus, the amount of the grease 63 exceeding the capacity of the grease groove 62 is prevented from being extracted from the grease groove 62 by the gear inner circumferential surface 64f of the drive transmission gear 64. As a result, the grease 63 can be continuously supplied for a long time period between the gear inner circumference sliding section 67 and the shaft outer circumferential surface 61f. The above-mentioned supplying of the grease 63 to both the gear inner circumference sliding section 67 and the shaft outer circumferential surface 61f is actually executed in the below described manner. Specifically, the grease 63 in the grease groove 62 is transferred onto the grease transfer surface 80 during the stop condition and is supplied to the shaft outer circumferential surface 61f when the drive transmission gear 64 and the grease transfer surface 80 move in the shaft direction during the operation condition. The drive transmission gear 64 returns to its original position and the grease transfer surface 80 approaches the grease groove 62 during the next stop condition, so that the grease 63 is transferred onto the grease transfer surface 80 again. In this way, due to repetitious movement of the drive transmission gear 64 in the shaft directions during the rotating and stopping conditions, the grease 63 filled in the grease groove 62 is supplied to both the gear inner circumference sliding section 67 and the shaft outer circumferential surface 61f.

Figure 11A:
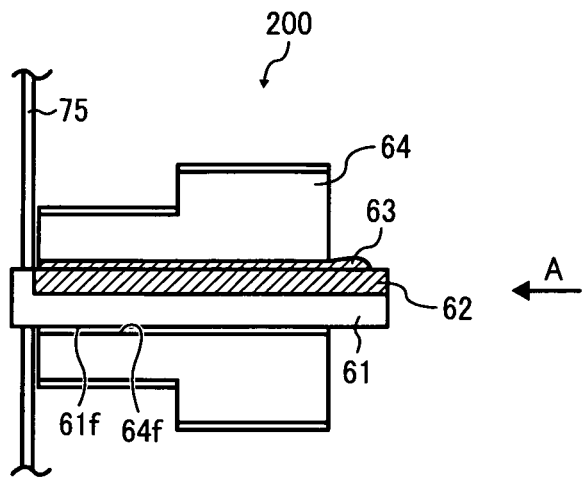
FIGS. 11A and 11B collectively illustrate a first conventional drive transmission system.
Figure 11B:
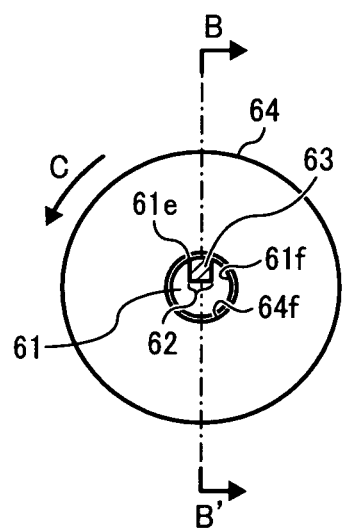

Further, since the groove edge section 61e extends in a direction perpendicular to the sliding direction in the first conventional example of FIGS. 11A and 11B, the gear inner circumferential surface 64f scrapes against the groove edge section 61e, the inner circumferential surface of the drive transmission gear 64 and the groove edge section 61e of the stationary shaft member 61 are scrapped off, thereby a foreign substance appears sometimes as the drive transmission gear 64 rotates. Similarly, when stress concentrates on the sliding section between the gear inner circumferential surface 64f and the groove edge section 61e in the first conventional example, the inner circumferential surface of the drive transmission gear 64 and the groove edge section 61e of the stationary shaft member 61 are scrapped off, thereby a foreign substance appears sometimes. When the foreign substance appears, the foreign substance necessarily contacts and slides on the gear inner circumference sliding section 67 even if the grease 63 remains between the gear inner circumference sliding section 67 and the shaft outer circumferential surface 61f. As a result, since the grease 63 is not attracted to the foreign substance, a noise occurs sometimes. By contrast, in the first embodiment of the drive transmission system 200, since the gear inner circumferential surface 64f does not face the groove edge section 61e, the inner circumferential surface of the drive transmission gear 64 and the groove edge section 61e of the stationary shaft member 61 are prevented from being scrapped off, and the noise is not generated by the foreign substance.

When producing the above-mentioned stationary shaft member 61 of the first conventional drive transmission system 200, a process needs milling. Specifically, to form the grease groove 62 in a shaft direction, a shaft member is set again onto a milling process machine and a milling process is then to be executed after the shaft member is produced using a lathe. Thus, two preparatory steps are needed, so that part cost and production time increase. By contrast, if a circular grease groove 62 is formed entirely around the shaft as in the stationary shaft member 61 of the drive transmission system 200 of the first embodiment, parts can be produced by one preparatory step using the lathe. Thus, a productivity of the stationary shaft member 61 of the first embodiment is more effective than that of the first conventional example.

Figure 5A:
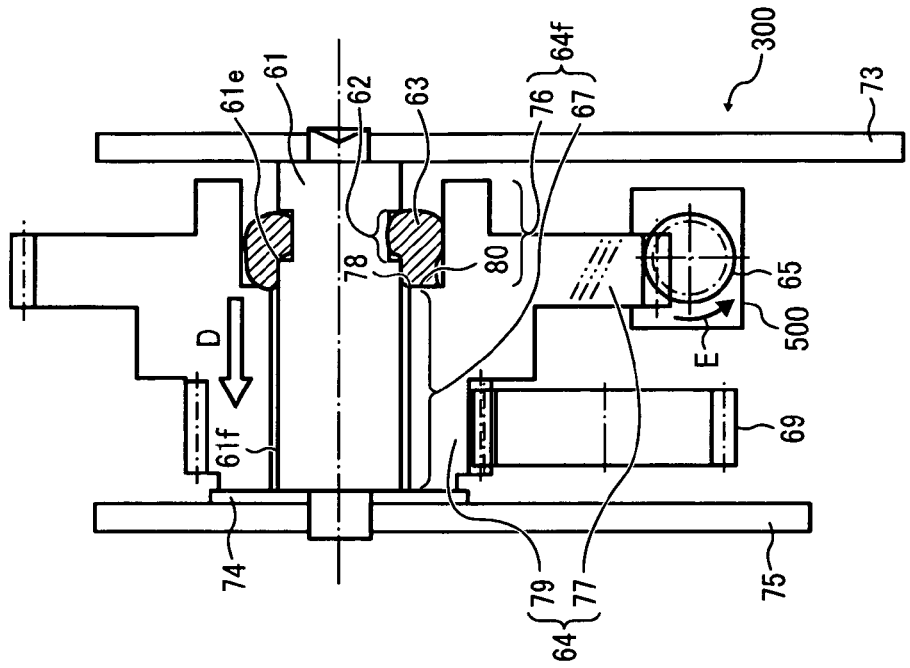
FIGS. 5A and 5B collectively illustrate an exemplary drive transmission system according to a second embodiment of the present invention.
Figure 5B:
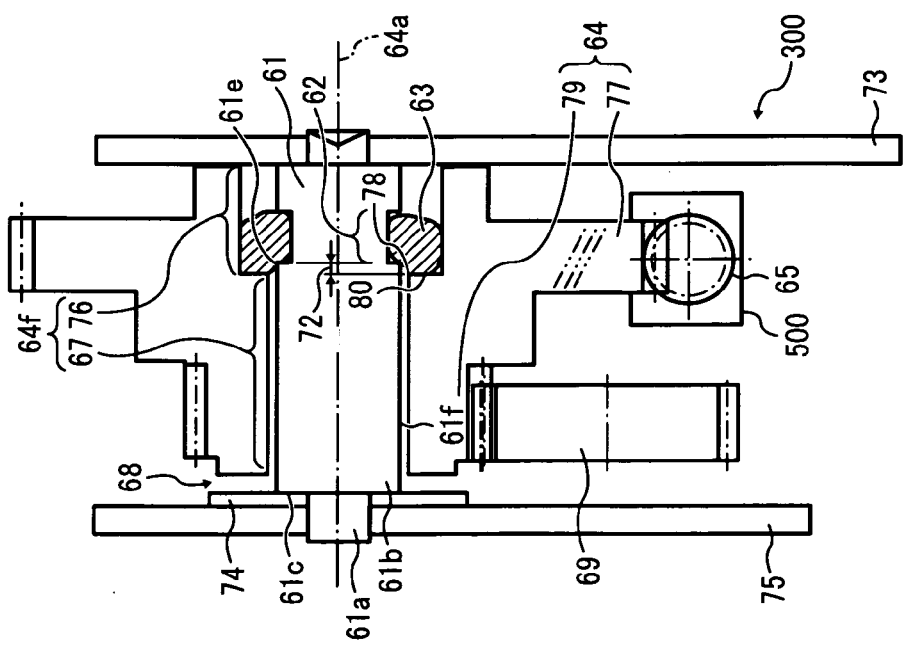

Now, a second embodiment of the drive transmission system 200 is described with reference to FIGS. 5A and 5B, which illustrate situations where a driving motor 500 stops and operates, respectively.

As shown, the second embodiment is only different from the first embodiment by that an input gear 65 is constituted by a worm gear, while a large diameter gear section 77 is constituted by a wheel gear in a drive transmission system 200. Therefore, only the difference is herein below described. As shown, the large diameter gear section 77 is linked with the input gear 65. The worm gear of the input gear 65 has a prescribed lead angle. For example, when the lead angle is 16 degrees, a lead angle of the large diameter gear section 77 of the wheel gear becomes 74 degrees. When the input gear 65 rotates in a direction shown by an arrow E, a thrusting force acts on the drive transmission gear 64 in a direction shown by an arrow D. A small diameter gear section 79 employs a flat gear as in the first embodiment, and is linked with an output gear 69. When a rotation driving force is transmitted from the input gear 65, the thrusting force is applied to the large diameter gear section 77, and accordingly the drive transmission gear 64 moves toward a washer 74. Thus, a grease transfer surface 80 of the drive transmission gear 64 also moves toward the washer 74. Consequently, grease 63 transferred onto the grease transfer surface 80 moves to a shaft outer circumferential surface 61f, and is supplied all around the shaft outer circumferential surface 61f when the drive transmission gear 64 rotates. As a result, wear can be suppressed or avoided between the shaft outer circumferential surface 61f and the gear inner circumference sliding section 67.

Further, similar to the drive transmission system 200 of the second embodiment, a bracket 73, a frame 75, and the washer 74 collectively serving as a restriction device restricts movement of the drive transmission gear 64 in the shaft direction of the stationary shaft member 61 so that the gear inner circumferential large diameter section 76 can face a grease groove 62 continuously. Thus, the amount of the grease 63 exceeding the capacity of the grease groove 62 is prevented from being extracted from the grease groove 62 by the gear inner circumferential surface 64f of the drive transmission gear 64, so that the grease 63 can be continuously supplied for a long time period between the gear inner circumference sliding sections 67 and the shaft outer circumferential surface 61f.

Further, since the gear inner circumferential surface 64f does not face a groove edge section 61e of the stationary shaft member 61, the inner circumferential surface of the drive transmission gear 64 and the groove edge section 61e are prevented from being scrapped off, and noise is not generated by foreign substances.

Now, a third embodiment of the drive transmission system 200 is described with reference to FIGS. 6A and 6B, which illustrate situations where a driving motor 500 stops and operates, respectively.

As shown, the third embodiment is only different from the first embodiment by that a large diameter gear section 77 of a drive transmission gear 64 and an input gear 65 employ bevel gears, respectively, while a wave washer is employed in a drive transmission system 200. Thus, only the difference is herein below described. As shown, the large diameter gear section 77 is linked with the input gear 65. The input gear 65 has a corn angle. A small diameter gear section 79 employs a flat gear as in the first embodiment, and is linked with an output gear 69. As the drive transmission gear 64 moves toward the wave washer 74, a grease transfer surface 80 of the drive transmission gear 64 moves toward the washer 74. When a rotation driving force is transmitted from the input gear 65, a thrusting force is applied to the large diameter gear section 77, and accordingly, the drive transmission gear 64, and the grease transfer surface 80 of the drive transmission gear 64 move toward the wave washer 74. At this moment, the wave washer receiving prescribed pressurization in a thrusting allowance 68 elastically deforms while the motor is stopped. Accordingly, due to a reactive force to the elastic deformation, an amount of movement of the bevel gear of the large diameter gear section 77 in the thrusting force working on direction D is restricted to be equal to or less than a half of a gear meshing width which is capable of preventing skipping of a teeth thereof. Owing to the above, grease 63 transferred onto the grease transfer surface 80 moves to a shaft outer circumferential surface 61$f$ as the grease transfer surface 80 moves toward the washer 74. Thus, when the drive transmission gear 64 rotates, the grease 63 is supplied all around the shaft outer circumferential surface 61$f$. As a result, wear can be suppressed or avoided between the shaft outer circumferential surface 61$f$ and the gear inner circumference sliding section 67. Further, with the reactive force of the wave washer 74, the drive transmission gear 64 moves in a direction in which the bevel gear 65 of the large diameter gear section 77 tightly meshed with the bevel gear of the input gear 65.

Further, similar to the above-mentioned several embodiments, a bracket 73, a frame 75, and the washer 74 collectively serving as a restriction device restricts movement of the drive transmission gear 64 in the shaft direction of the stationary shaft member 61 so that the gear inner circumferential large diameter section 76 can face a grease groove 62 continuously as in the drive transmission system 200 of the third embodiment. Thus, the amount of the grease 63 exceeding the capacity of the grease groove 62 is prevented from being extracted from the grease groove 62 by the gear inner circumferential surface 64$f$ of the drive transmission gear 64, so that the grease 63 can be continuously supplied for a long time period between the gear inner circumference sliding sections 67 and the shaft outer circumferential surface 61$f$. Further, since the gear inner circumferential surface 64$f$ does not face a groove edge section 61$e$ of the stationary shaft member 61, the inner circumferential surface of the drive transmission gear 64 and the groove edge section 61$e$ are prevented from being scrapped off, and noise is not generated by foreign substance.

Figure 7A:
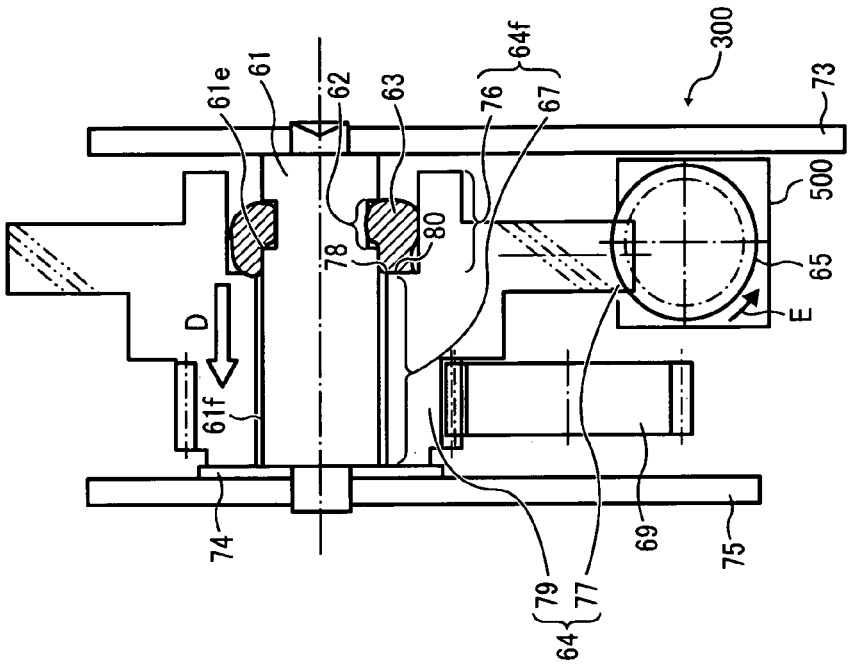
FIGS. 7A and 7B collectively illustrate an exemplary drive transmission system according to a fourth embodiment of the present invention.
Figure 7B:
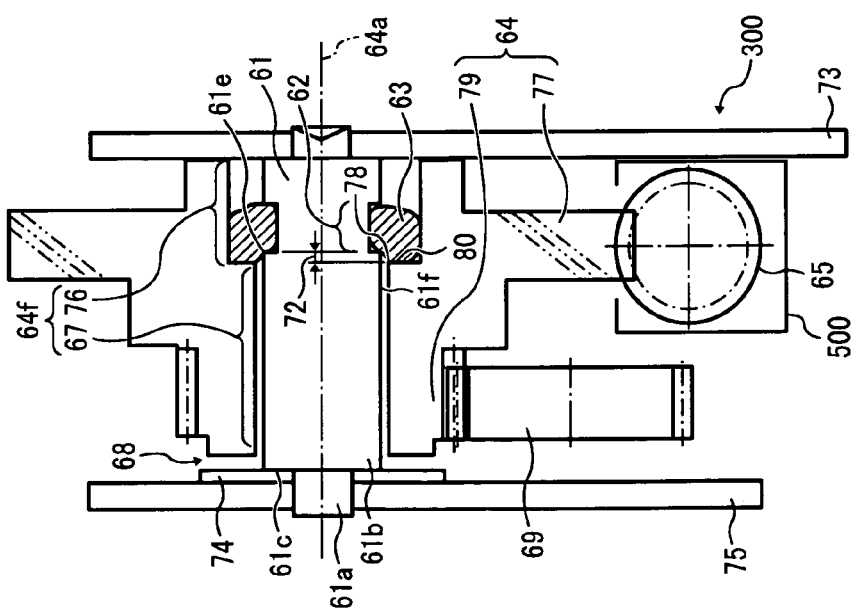

Now, a fourth embodiment of the drive transmission system 200 is described with reference to FIGS. 7A and 7B, which illustrate situations where a driving motor 500 stops and operates, respectively.

As shown, the fourth embodiment is only different from the first embodiment by that a large diameter gear section 77 of a drive transmission gear 64 as a two-step gear employs a worm gear and an input gear 65 employs a wheel gear in a drive transmission system 200. Therefore, only the difference is herein below described. As shown, the large diameter gear section 77 is linked with the input gear 65. The wheel gear of the input gear 65 has a lead angle. For example, when the lead angle is 74 degrees, a lead angle of the large diameter gear section 77 of the worm gear becomes 16 degrees. When the input gear 65 rotates in a direction shown by an arrow E, a thrusting force acts on the drive transmission gear 64 in a direction shown by an arrow D. A small diameter gear section 79 employs a flat gear as in the first embodiment, and is linked with an output gear 69. When a rotation driving force is transmitted from the input gear 65, a thrusting force is applied to the large diameter gear section 77, and accordingly, the drive transmission gear 64 moves toward a washer 74.

Thus, a grease transfer surface 80 formed on the drive transmission gear 64 also moves toward the washer 74. Consequently, grease 63 transferred onto the grease transfer surface 80 moves to a shaft outer circumferential surface 61$f$. When the drive transmission gear 64 rotates, the grease 63 is supplied all around the shaft outer circumferential surface 61$f$. As a result, wear can be suppressed or avoided between the shaft outer circumferential surface 61$f$ and the gear inner circumference sliding section 67.

Further, similar to the above-mentioned several embodiments, a bracket 73, a frame 75, and the washer 74 collectively serving as a restriction device restricts movement of the drive transmission gear 64 in the shaft direction of the stationary shaft member 61 so that the gear inner circumferential large diameter section 76 can face a grease groove 62 continuously as in the drive transmission system 200 of the fourth embodiment. Thus, the amount of the grease 63 exceeding the capacity of the grease groove 62 is prevented from being extracted from the grease groove 62 by the gear inner circumferential surface 64$f$ of the drive transmission gear 64, so that the grease 63 can be continuously supplied for a long time period between the gear inner circumference sliding sections 67 and the shaft outer circumferential surface 61$f$.

Further, since the gear inner circumferential surface 64$f$ does not face the groove edge section 61$e$ of the stationary shaft member 61, the inner circumferential surface of the drive transmission gear 64 and the groove edge section 61$e$ are prevented from being scrapped off, and noise is not generated by foreign substance.

Figure 8A:
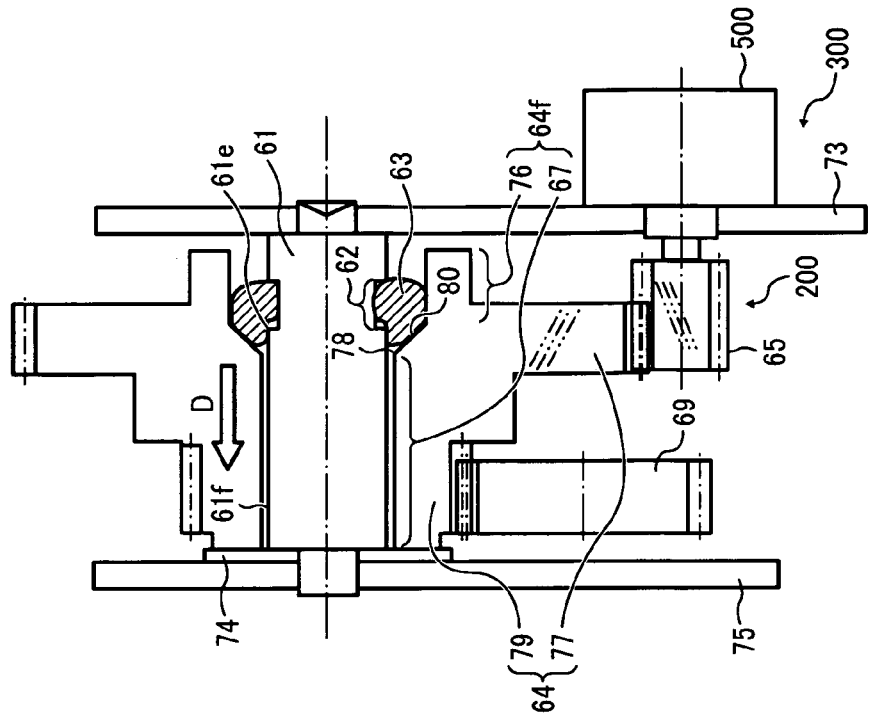
FIGS. 8A and 8B collectively illustrate an exemplary drive transmission system according to a fifth embodiment of the present invention.
Figure 8B:
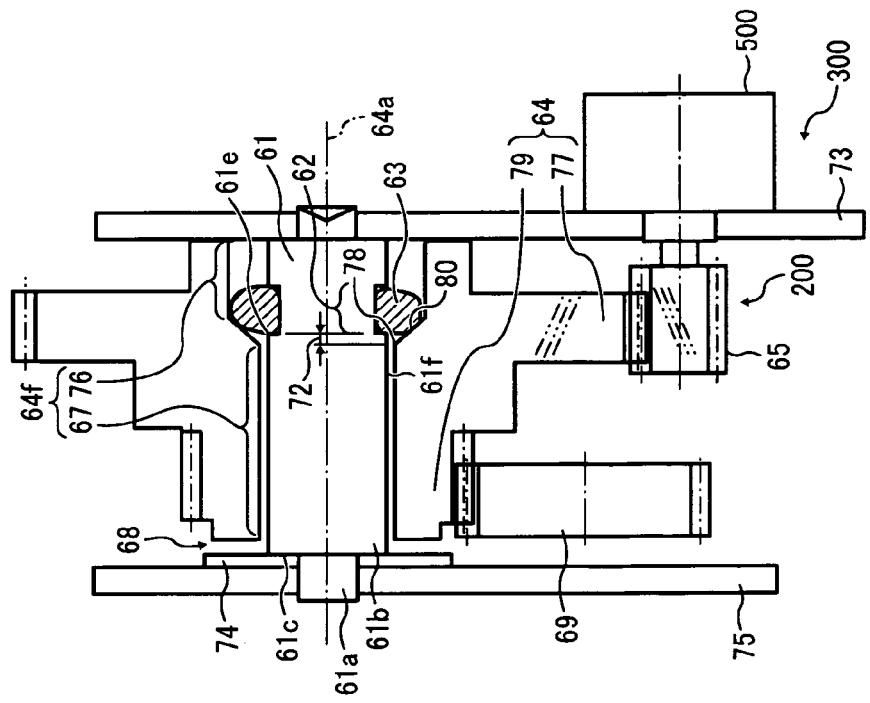

Now, a fifth embodiment of the drive transmission system 200 is described with reference to FIGS. 8A and 8B, which illustrate situations where a driving motor 500 stops and operates, respectively.

In the above-mentioned drive transmission system 200 of the first embodiment, the grease transfer surface 80 is formed on a plane perpendicular to a rotation central line 64$a$ between the sliding section large diameter side edge 78 of the gear inner circumferential surface 67 and the gear inner circumferential large diameter section 76. However, a grease transfer surface 80 of the drive transmission system 200 of the fifth embodiment is inclined with regard to the rotation central line 64$a$. Therefore, only such a difference is herein below described. As shown, a large diameter gear section 77 and an input gear 65 are constituted by helical gears, respectively. When the input gear 65 and the drive transmission gear 64 rotate, a thrusting force acts on the drive transmission gear 64 in a direction in parallel to the rotation central line 64$a$ thereof as shown by an arrow D.

Grease 63 filled in a space formed between the gear inner circumference large diameter section 76 and the grease groove 62 is transferred onto the grease transfer surface 80 of the slant plane between the sliding section large diameter side edge 78 and the gear inner circumference large diameter section 76 while the motor is stopped. When the input gear 65 and the drive transmission gear 64 rotate, and a thrusting force acts on the drive transmission gear 64 in a direction shown by the arrow D in parallel to the rotation central line 64$a$, the slant grease transfer surface 80 of the drive transmission gear 64 moves toward the washer 74. As a result, the grease 63 transferred onto the slant grease transfer surface 80 moves to the shaft outer circumferential surface 61$f$ and is supplied to all around the shaft outer circumferential surface 61$f$ as the drive transmission gear 64 rotates. As a result, wearing can be avoided or suppressed between the shaft outer circumferential surface 61f and the gear inner circumference sliding section 67.

Further, similar to the above-mentioned several embodiments, a bracket 73, a frame 75, and the washer 74 collectively serving as a restriction device restricts movement of the drive transmission gear 64 in the shaft direction of the stationary shaft member 61 so that the gear inner circumferential large diameter section 76 can face a grease groove 62 continuously as in the drive transmission system 200 of the fifth embodiment. Thus, the amount of the grease 63 exceeding the capacity of the grease groove 62 is prevented from being extracted from the grease groove 62 by the gear inner circumference 64f of the drive transmission gear 64, so that the grease 63 can be continuously supplied for a longer time period between the gear inner circumference sliding sections 67 and the shaft outer circumferential surface 61f than before. Further, since the gear inner circumferential surface 64f does not face the groove edge section 61e, the inner circumferential surface of the drive transmission gear 64 and the groove edge section 61e of the stationary shaft member 61 are prevented from being scrapped off, and noise is not generated by foreign substance.

Figure 9A:
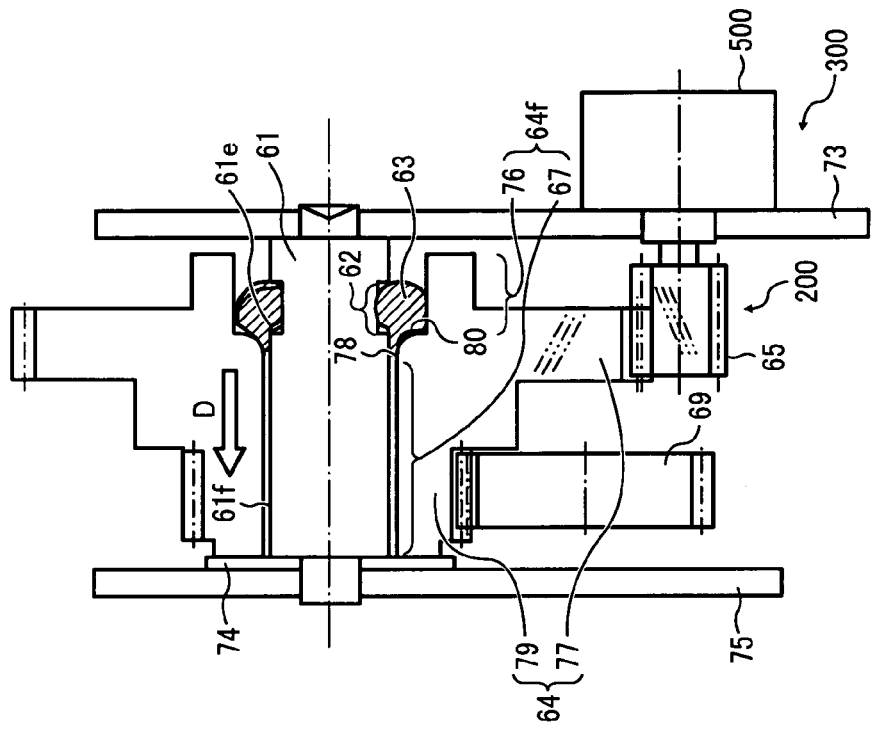
FIGS. 9A and 9B collectively illustrate an exemplary drive transmission system according to a sixth embodiment of the present invention.
Figure 9B:
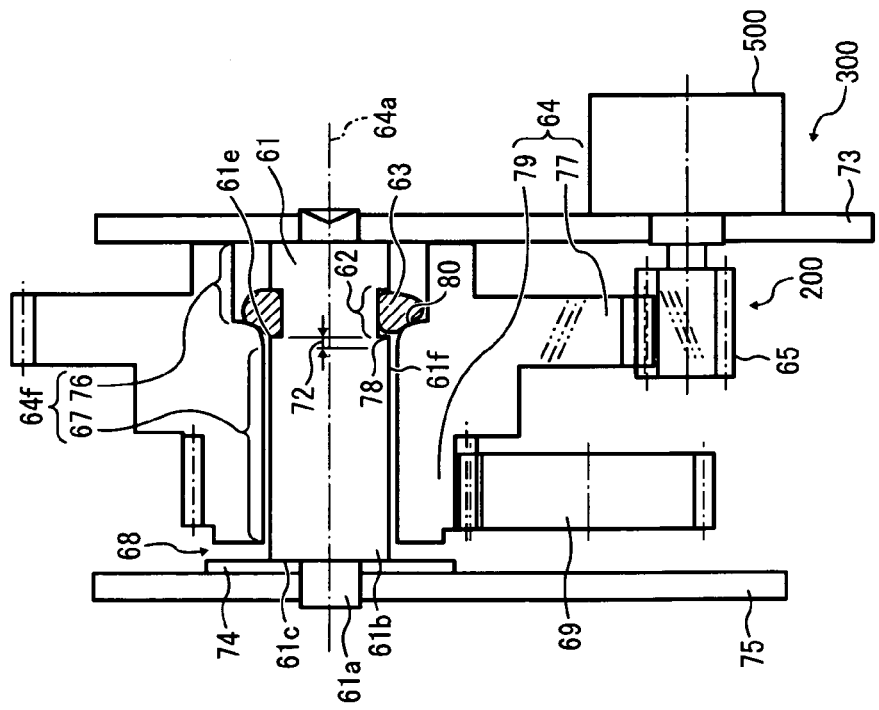

Now, a sixth embodiment of the drive transmission system 200 is described with reference to FIGS. 9A and 9B, which illustrate situations where a driving motor 500 stops and operates, respectively.

In the above-mentioned drive transmission system 200 of the first embodiment, the grease transfer surface 80 is formed on the plane perpendicular to the rotation central line 64a between the sliding section large diameter side edge 78 of the gear inner circumference sliding section 67 and the gear inner circumferential large diameter section 76. However, a grease transfer surface 80 of the drive transmission system 200 of the sixth embodiment has an R letter shape in the sixth embodiment of the drive transmission system 200 as only a difference therefrom. Therefore, only such a difference is herein below described. As shown, a large diameter gear section 77 and the input gear 65 are constituted by helical gears as in the first embodiment. When the input gear 65 and the drive transmission gear 64 rotate, a thrusting force acts on the drive transmission gear 64 in a direction in parallel to the rotation central line 64a thereof as shown by an arrow D.

Grease 63 filled in a space formed between the gear inner circumference large diameter section 76 and the grease groove 62 is transferred onto the grease transfer surface 80 of the R letter shape plane between the sliding section large diameter side edge 78 and the gear inner circumference large diameter section 76 while the motor is stopped. When the input gear 65 and the drive transmission gear 64 rotate and the thrusting force acts on the drive transmission gear 64 in a direction shown by the arrow D parallel to the rotation central line 64a thereof, the R-shaped grease transfer surface 80 of the drive transmission gear 64 moves toward the washer 74. As a result, the grease 63 transferred onto the R letter shape grease transfer surface 80 moves to the shaft outer circumferential surface 61f and is supplied all around the shaft outer circumferential surface 61f as the drive transmission gear 64 rotates. As a result, wearing can be avoided or suppressed between the shaft outer circumferential surface 61f and the gear inner circumference sliding section 67.

Further, similar to the above-mentioned several embodiments, a bracket 73, a frame 75, and the washer 74 collectively serving as a restriction device restricts movement of the drive transmission gear 64 in the shaft direction of the stationary shaft member 61 so that the gear inner circumferential large diameter section 76 can face a grease groove 62 continuously as in the drive transmission system 200 of the sixth embodiment. Thus, the amount of the grease 63 exceeding the capacity of the grease groove 62 is prevented from being extracted from the grease groove 62 by the gear inner circumferential surface 64f of the drive transmission gear 64, so that the grease 63 can be continuously supplied for a longer time period between the gear inner circumference sliding sections 67 and the shaft outer circumferential surface 61f than before. Further, since the gear inner circumferential surface 64f does not face the groove edge section 61e of the stationary shaft member 61, the inner circumferential surface of the drive transmission gear 64 and the groove edge section 61e are prevented from being scarped off, and noise is not generated by foreign substance.

Figure 10A:
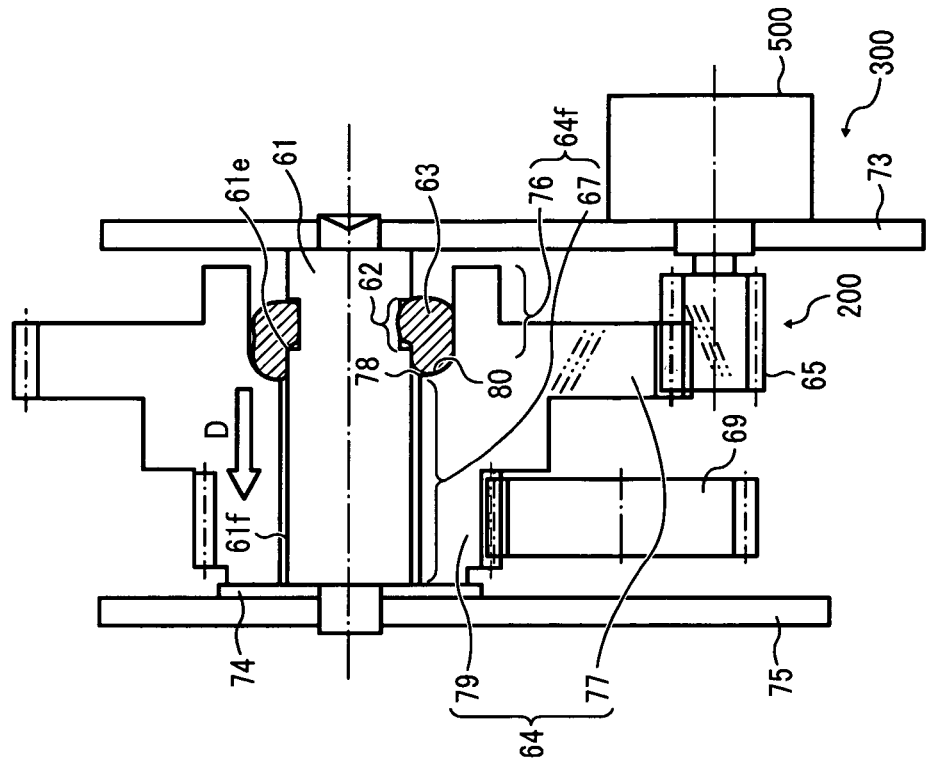
FIGS. 10A and 10B collectively illustrate an exemplary drive transmission system according to a seventh embodiment of the present invention.
Figure 10B:
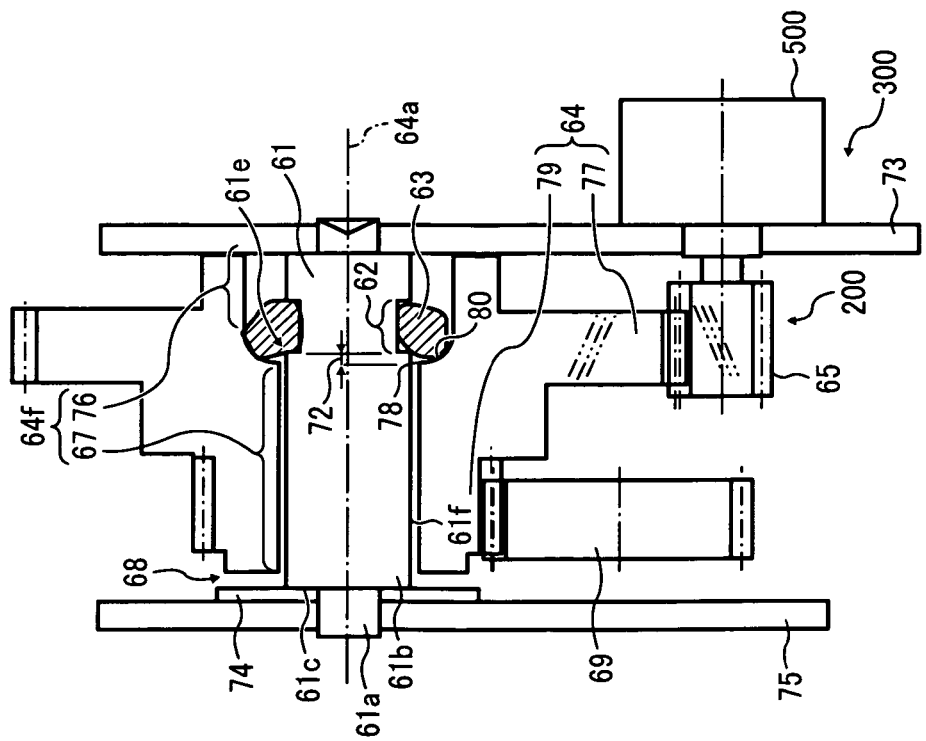

Now, a seventh embodiment of the drive transmission system 200 is described with reference to FIGS. 10A and 10B, which illustrate situations where a driving motor 500 stops and operates, respectively.

In the above-mentioned drive transmission system 200 of the first embodiment, the grease transfer surface 80 is formed on the plane perpendicular to the rotation central line 64a between the sliding section large diameter section edge 78 of the gear inner circumference sliding section 67 and the gear inner circumferential large diameter section 76. However, a grease transfer surface 80 of the drive transmission system 200 of the seventh embodiment is an envelope state as only a difference therefrom. Therefore, only such a difference is herein below described. As shown, a large diameter gear section 77 and an input gear 65 are constituted by helical gears in the first embodiment. When the input gear 65 and the drive transmission gear 64 rotate, a thrusting force acts on the drive transmission gear 64 in a direction in parallel to the rotation central line 64a thereof as shown by an arrow D.

Grease 63 filled in a space formed between a gear inner circumference large diameter section 76 and a grease groove 62 is transferred onto the envelope state grease transfer surface 80 between a sliding section large diameter side edge 78 and a gear inner circumference large diameter section 76 while the motor is stopped. When the input gear 65 and the drive transmission gear 64 rotate and the thrusting force acts on the drive transmission gear 64 in a direction shown by the arrow. D in parallel to the rotation central line 64a thereof, the envelope state grease transfer surface 80 of the drive transmission gear 64 moves toward the washer 74.

As a result, the grease 63 transferred onto the envelope state grease transfer surface 80 moves to the shaft outer circumferential surface 61f and is supplied to all around the shaft outer circumferential surface 61f as the drive transmission gear 64 rotates. As a result, wearing can be avoided or suppressed between the shaft outer circumferential surface 61f and the gear inner circumference sliding section 67.

As mentioned heretofore, by making the grease transfer surface 80 being inclined or in an R shape or an envelope shape, the grease transfer surface 80 can serve as a guide for conveying the grease 63 onto the shaft outer circumferential surface 61f, so that the grease can readily move to the sliding section between the shaft outer circumferential surface 61f and the gear inner circumferential surface 64f.

Further, similar to the above-mentioned several embodiments, a bracket 73, a frame 75, and the washer 74 collectively serving as a restriction device restricts movement of the drive transmission gear 64 in the shaft direction of the stationary shaft member 61 so that the gear inner circumferential large diameter section 76 can face a grease groove 62 continuously as in the drive transmission system 200 of the seventh embodiment. Thus, the amount of the grease 63 exceeding the capacity of the grease groove 62 is prevented from being extracted from the grease groove 62 by the gear inner circumferential surface 64f of the drive transmission gear 64, so that the grease 63 can be continuously supplied for a longer time period between the gear inner circumference sliding sections 67 and the shaft outer circumferential surface 61f than before.

Further, since the gear inner circumferential surface 64f does not face the groove edge section 61e, the inner circumferential surface of the drive transmission gear 64 and the groove edge section 61e of the stationary shaft member 61 are prevented from being scrapped off, and noise is not generated by foreign substance.

Numerous additional modifications and variations of the present invention are possible in latent image of the above teachings. It is therefore to be understood that within the scope of the appended claims, the present invention may be practiced otherwise that as specifically described herein.

ADVANTAGE

According to one embodiment of the present invention, since the grease 63 can be continuously supplied for a longer time period between the gear inner circumference sliding sections and the shaft outer circumferential surface than before, they can enjoy long lives.

What is claimed is:

1. A drive transmission system comprising:
   a shaft member including;
      a shaft outer circumferential sliding section on its outer circumferential surface, and
      a shaft outer circumferential small diameter section having a smaller diameter than that of the shaft outer circumferential sliding section, said shaft outer circumferential smaller diameter section forming a circular groove storing grease;
   a drive transmission gear freely rotatably supported by the shaft member therearound, said drive transmission gear being rotated when a rotation driving force is input thereto, said drive transmission gear including,
      a gear inner circumferential sliding section on its inner circumferential surface, said gear inner circumferential sliding section contacting and sliding on the shaft outer circumferential sliding section of the shaft member when the drive transmission gear rotates, and
      a gear inner circumferential large diameter section having a large diameter than that of the gear inner circumferential sliding section on its inner circumferential surface;
   a gear moving device configured to move the drive transmission gear reciprocally along the shaft member in a shaft direction; and
   a restriction device configured to restrict movement of the drive transmission gear along the shaft member in the shaft direction to enable the gear inner circumferential large diameter section to face the shaft outer circumferential small diameter section substantially continuously.

2. The drive transmission system as claimed in claim 1, wherein said gear moving device includes a gear mechanism configured to provide a thrusting force to the drive transmission gear when rotating the drive transmission gear.

3. The drive transmission system as claimed in claim 2, wherein said gear mechanism includes a helical gear.

4. The drive transmission system as claimed in claim 2, wherein said gear mechanism includes a wheel gear.

5. The drive transmission system as claimed in claim 2, wherein said gear mechanism includes a bevel gear.

6. The drive transmission system as claimed in claim 2, wherein said gear mechanism includes a worm wheel.

7. The drive transmission system as claimed in claim 2, wherein said drive transmission gear is a two-step gear having two gears, wherein at least one of said two gears is a helical gear.

8. The drive transmission system as claimed in claim 1, wherein a diameter of an inner circumference surface of the drive transmission gear increases from the gear inner circumferential sliding section to the gear inner circumferential large diameter section forming a chamfered cross section therebetween.

9. The drive transmission system as claimed in claim 1, wherein a diameter of an inner circumference surface of the drive transmission gear gradually increases from the gear inner circumferential sliding section to the gear inner circumferential large diameter section forming a round shaped cross section therebetween.

10. The drive transmission system as claimed in claim 1, wherein a diameter of an inner circumference surface of the drive transmission gear gradually increases from the gear inner circumferential sliding section to the gear inner circumferential large diameter section forming a cutaway cross section therebetween.

11. A drive system comprising:
    a drive source configured to drive and rotate an objective; and
    a drive transmission device configured to transmit a rotation driving force from the drive source to a rotation member, said drive transmission device including the drive transmission system as claimed in claim 1.

12. An image forming apparatus comprising:
    an image formation section configured to form an image on a recording medium by forming an image on an image bearer and transferring the image onto the recording medium; and
    a driving device configured to drive a driving objective arranged in an apparatus body, wherein said driving device includes the drive system as claimed in claim 11.

13. A drive transmission system comprising:
    a shaft member including;
    a shaft outer circumferential sliding section on its outer circumferential surface, and
    a shaft outer circumferential small diameter section having a smaller diameter than that of the shaft outer circumferential sliding section;
    a drive transmission gear freely rotatably supported by the shaft member therearound, said drive transmission gear being rotated when a rotation driving force is input thereto, said drive transmission gear including,
       a gear inner circumferential sliding section on its inner circumferential surface, said gear inner circumferential sliding section contacting and sliding on the shaft outer circumferential sliding section of the shaft member when the drive transmission gear rotates, and
       a gear inner circumferential large diameter section having a large diameter than that of the gear inner circumferential sliding section on its inner circumferential surface;
    a gear moving device configured to move the drive transmission gear reciprocally along the shaft member in a shaft direction; and
    a restriction device configured to restrict movement of the drive transmission gear along the shaft member in the shaft direction to enable the gear inner circumferential large diameter section to face the shaft outer circumferential small diameter section substantially continuously.

14. The drive transmission system as claimed in claim 13, wherein said gear moving device includes a gear mechanism configured to provide a thrusting force to the drive transmission gear when rotating the drive transmission gear.

15. The drive transmission system as claimed in claim 14, wherein said gear mechanism includes a helical gear.

16. The drive transmission system as claimed in claim 14, wherein said gear mechanism includes a wheel gear.

17. The drive transmission system as claimed in claim 14, wherein said gear mechanism includes a bevel gear.

18. The drive transmission system as claimed in claim 14, wherein said gear mechanism includes a worm wheel.

19. A drive system comprising:
a drive source configured to drive and rotate an objective; and
a drive transmission device configured to transmit a rotation driving force from the drive source to a rotation member, said drive transmission device including the drive transmission system as claimed in claim 13.

20. An image forming apparatus comprising:
an image formation section configured to form an image on a recording medium by forming an image on an image bearer and transferring the image onto the recording medium; and
a driving device configured to drive a driving objective arranged in an apparatus body, wherein said driving device includes the drive system as claimed in claim 19.

* * * * *